US011703568B2

(12) United States Patent
Degenfeld-Schonburg et al.

(10) Patent No.: US 11,703,568 B2
(45) Date of Patent: Jul. 18, 2023

(54) METHOD FOR PROVIDING A DETECTION SIGNAL FOR OBJECTS TO BE DETECTED

(71) Applicant: Robert Bosch GmbH, Stuttgart (DE)

(72) Inventors: Peter Degenfeld-Schonburg, Renningen (DE); Fabian Utermoehlen, Lippstadt (DE); Stefan Leidich, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 830 days.

(21) Appl. No.: 16/636,496

(22) PCT Filed: Jul. 30, 2018

(86) PCT No.: PCT/EP2018/070589
§ 371 (c)(1),
(2) Date: Mar. 27, 2020

(87) PCT Pub. No.: WO2019/030041
PCT Pub. Date: Feb. 14, 2019

(65) Prior Publication Data
US 2020/0386859 A1    Dec. 10, 2020

(30) Foreign Application Priority Data

Aug. 8, 2017   (DE) .................... 10 2017 213 729.0

(51) Int. Cl.
*G01S 7/481*   (2006.01)
*G01S 17/26*   (2020.01)
(Continued)

(52) U.S. Cl.
CPC ............ *G01S 7/481* (2013.01); *G01S 7/4817* (2013.01); *G01S 7/4861* (2013.01);
(Continued)

(58) Field of Classification Search
None
See application file for complete search history.

(56) References Cited

U.S. PATENT DOCUMENTS

| 4,413,905 A | 11/1983 | Holzapfel |
| 5,291,263 A | 3/1994 | Kong |

(Continued)

FOREIGN PATENT DOCUMENTS

| DE | 102007032997 | 1/2009 |
| DE | 202009015194 | 2/2010 |

(Continued)

OTHER PUBLICATIONS

International Search Report dated Nov. 20, 2018 for corresponding International Application PCT/EP2018/070589, filed Jul. 30, 2018.

(Continued)

*Primary Examiner* — Yuqing Xiao
*Assistant Examiner* — Jempson Noel
(74) *Attorney, Agent, or Firm* — Norton Rose Fulbright US LLP; Gerard Messina (57) ABSTRACT

A method for providing a detection-signal for objects to be detected—at least a first and second light-beam including different frequencies being generated with a first optical non-linear 3-wave-process from a light-beam of a light-source including an output-frequency, and the first light-beam including a reference-frequency being detected, and the second light-beam including an object-frequency being emitted and received after reflection on an object, and the light-beam including the output-frequency and the second light-beam including the object-frequency being superposed, and a reference-beam including a reference-frequency being generated with a second optical non-linear 3-wave-process from the two superposed light-beams including the output-frequency and including the object- (Continued)

frequency, and a detection-signal being generated so that the object-distance is determinable due to the aforementioned superposition based on the time-difference between the detection of the first light-beam including the reference-frequency and a detection of a change of the reference-beam including the reference-frequency.

11 Claims, 4 Drawing Sheets

(51) Int. Cl.
*G01S 7/4861* (2020.01)
*G01S 7/4865* (2020.01)
*G02F 1/35* (2006.01)
*G02F 1/355* (2006.01)
*G02F 1/39* (2006.01)

(52) U.S. Cl.
CPC .......... *G01S 7/4865* (2013.01); *G01S 17/26* (2020.01); *G02F 1/3501* (2013.01); *G02F 1/3534* (2013.01); *G02F 1/3551* (2013.01); *G02F 1/39* (2013.01); *G02F 1/3507* (2021.01)

(56) References Cited

U.S. PATENT DOCUMENTS

| 7,280,186 | B1 | 10/2007 | Ionov |
| 2005/0243324 | A1* | 11/2005 | Freeling .................. G01J 3/02 |
| | | | 356/450 |
| 2007/0002307 | A1 | 1/2007 | Zaugg |
| 2010/0079745 | A1 | 4/2010 | Eno et al. |
| 2012/0076503 | A1 | 3/2012 | Habif et al. |
| 2015/0177128 | A1 | 6/2015 | Zeilinger et al. |

FOREIGN PATENT DOCUMENTS

| JP | H02226035 A | 9/1990 |
| JP | 2016053566 A | 4/2016 |

OTHER PUBLICATIONS

Rarity, J. G. et al. "Experimental Demonstration of Single Photon Rangefinding Using Parametric Downconversion," Applied Optics, Optical Society of America, New York, US, vol. 29, No. 19, Jul. 1, 1990, pp. 2939-2943.

* cited by examiner

Fig. 5

METHOD FOR PROVIDING A DETECTION SIGNAL FOR OBJECTS TO BE DETECTED

FIELD OF THE INVENTION

The present invention relates to a method for providing a detection signal for objects to be detected.

The present invention also relates to a sensor device for providing a detection signal for objects to be detected.

The present invention further relates to a LIDAR scanner, in particular, to a micro-scanner.

The present invention, although applicable to arbitrary sensor devices, is explained with reference to LIDAR macro-scanners.

BACKGROUND INFORMATION

LIDAR macro-scanners may include, for example, a rotor, on which optical elements such as a light source and a detector are situated. Additional scanners include only a mirror for beam deflection as a rotating element. A light beam is emitted in a known manner using a pulsed light source, for example, in the form of a laser and its reflection on an object is detected in order to determine the distance of the object on the basis of the reflected light. For this purpose, the macro-scanner may include a so-called coaxial arrangement of transmission path and receiving path, in which the reflected light is guided via the light path of the emitting optical system. In order to then be able to detect sufficient light in the receiver, the optical components, in particular the mirror of the receiving path, are selected to be correspondingly large. When using biaxial arrangements, a large detector array is employed due to the lens size and to the image scale in order to reduce the optical noise power, for example, as a result of sunlight or of other extraneous light sources. Biaxial arrangements having static receiving channels are usually illuminated from a large angular range and exhibit a low signal-to-noise ratio and, therefore, range.

Eye safety may also be relevant in the configuration of a LIDAR sensor device for consumer products and automotive products.

A safety scanner for monitoring a scanning plane for the occurrence of objects in the scanning plane has been discussed in DE 20 2009 015 194 U1, including a light transmitter, a light deflection unit for deflecting the light into the scanning plane, a receiver for providing received signals as a function of light re-emitted on objects present in the field of vision of the scanner, and an evaluation unit for evaluating the received signals and for providing a safety signal, the light transmitter emitting light at a wavelength between 1200 nm and 1700 nm.

A laser scanner for determining roadway properties has become discussed in DE 10 2007 032 997 A1, which uses two wavelengths—900 nm and 1550 nm, in order to be able to identify different reflections.

In addition, a method for imaging with the aid of photons in quantum mechanical states using two different wavelengths has been discussed in US 2015/0177128 A1. In this method, photons of a first wavelength are used for illuminating sample material and photons of a second wavelength are fed to a detector, the photons not being emitted and thus being separated from the light path.

In one specific embodiment, the present invention provides a method for providing a detection signal for objects to be detected, at least one first and one second light beam including different frequencies being generated with the aid of a first optical non-linear 3-wave process from a light beam of a light source including an output frequency, and the first light beam including a reference frequency being detected, and the second light beam including an object frequency being emitted and being received after reflection on an object, and the light beam including the output frequency and the second light beam including the object frequency being superposed, and a reference beam including a reference frequency being generated with the aid of a second optical non-linear 3-wave process from the two superposed light beams including the output frequency and including the object frequency, and a detection signal being generated in such a way that the distance of the object is determinable due to the aforementioned superposition on the basis of the time difference between the detection of the first light beam including the reference frequency and a detection of a change of the reference beam including the reference frequency.

In a further specific embodiment, the present invention provides a sensor device for providing a detection signal for objects to be detected, including a light source for generating an output beam including at least one output frequency, a first beam generation unit for generating at least one first and one second light beam of different frequency with the aid of a first optical non-linear 3-wave process from the output beam, a second beam generation unit for generating a reference beam including a reference frequency with the aid of a second optical non-linear 3-wave process from a superposition of the second light beam emitted and received after reflection on an object and the light beam including the output frequency, and a detection unit for detecting light, the detection unit being configured to generate a detection signal in such a way that the distance of the object is determinable due to the aforementioned superposition on the basis of the time difference between the detection of the first light beam including the reference frequency and a detection of a change of the reference beam including the reference frequency.

In a further specific embodiment, the present invention provides a LIDAR scanner, in particular, a micro-scanner that includes at least one sensor device as described herein, the LIDAR scanner including a micromechanical mirror for deflecting a beam of the first beam generation unit.

In other words, at least one of the specific embodiments of the present invention provides a sensor device, in which two additional light beams, object beam and reference beam including different frequencies, are generated by a first optical non-linear 3-wave process using the light of a light source. The reference beam is measured directly, whereas the object beam is transmitted to the object to be scanned or into the corresponding region/area. The object beam, if it strikes an object, is at least partially reflected and the light of the object beam thus reflected is detected. The reflected light of the object beam together with the light beam of the light source are superposed. With a second optical non-linear 3-wave process, it is then possible to generate a change in the light beam to be detected. In the process, the time between the initial measurement of the reference beam and the detection of a change of the portion of the reference beam including a reference frequency is useful for determining the object distance due to the superposition of the received object beam and the reference beam.

One of the advantages achieved is that eye safety may be improved, in particular, in that the transmission power may be increased regardless of the configuration of the detector. One further advantage is the high degree of sensitivity, since a completely different noise power path is utilized. One further advantage is an enhanced flexibility, since a flat detector, for example, may also be used in a biaxial arrangement. One further advantage is that the installation space may be reduced, since smaller detectors or detector units may be used with the same signal-to-noise ratio. Simpler wavelength filters may also be used, since narrowband, angle-independent wavelength filters, which are costly to produce, may be omitted.

The term "Black Silicon" is understood to mean the color of the silicon wafer.

The term "non-linear 3-wave process" is to be understood in its broadest sense and relates, in particular, in the description, as described herein, to a process, in which a non-linear optical effect is utilized in order to generate two electromagnetic waves including different output frequencies from one electromagnetic wave including an input frequency or to generate one electromagnetic wave including an output frequency from two electromagnetic waves including different input frequencies. Examples of a non-linear optical effect are frequency doubling or the Kerr effect.

Further features, advantages and further specific embodiments of the present invention are described below or become apparent thereby.

According to one advantageous refinement, the intensity of the reference beam including the reference frequency changes, in particular, increases due to the aforementioned superposition. This allows for a simple and reliable detection of the point in time of the superposition.

According to one further advantageous refinement, the first and/or second beam generation unit includes a non-linear optical crystal. One of the advantages achieved thereby is that a parametric optical process and/or a non-linear optical effect may be provided in a simple and simultaneously reliable manner.

According to one further advantageous refinement, the non-linear optical crystal is manufactured from, in particular, periodically polarized potassium titanyl phosphate, lithium niobate and/or stoichiometric lithium tantalate and/or barium borate, lithium triborate, bismuth borate and/or potassium hydrogen phosphate. In this way, it is possible to flexibly manufacture a non-linear optical crystal.

According to one further advantageous refinement, the first beam generation unit is configured to provide the first optical non-linear 3-wave process with the aid of spontaneous parametric fluorescence. One of the advantages achieved thereby is that two light beams may be generated in a simple and simultaneously reliable manner with the aid of parametric fluorescence, also known by the term "parametric down-conversion."

According to one further advantageous refinement, the second beam generation unit is configured to provide the second optical non-linear 3-wave process with the aid of difference frequency generation. One of the advantages achieved thereby is that two light beams may be generated in a simple and simultaneously reliable manner with the aid of difference frequency generation.

According to one further advantageous refinement, the light source is configured for generating pulsed light. With the aid of light pulses, simpler and time-resolved measurements are possible.

According to one further advantageous refinement, the light source is controllable with the aid of a pulse-modulated current source. In this way, the light source may be easily controlled.

According to one further advantageous refinement, the detection unit includes a photodiode, in particular, an avalanche photodiode and/or an SPAD diode. In this way, a simple and simultaneously reliable detection unit may be provided. If an SPAD diode is used, it is then possible to detect individual photons. This allows for a reliable detection, even at low light intensity.

According to one further advantageous refinement, an absorber is provided, at least for light beams from the second beam generation unit. One of the advantages achieved is that the light beams from the second beam generation unit may be blocked out in a simple and reliable manner. An absorber for laser light not needed may also be provided.

According to one further advantageous refinement, the absorber is manufactured from black silicon. In this way, light may be effectively absorbed.

According to one further advantageous refinement, a receiving unit for receiving light beams reflected by objects is provided, which includes a frequency filter, in particular, a bandpass filter, which is configured to suppress the first light beam and for transmitting the second light beam. One possible advantage is that extraneous light may be reliably blocked out. In this case, the bandpass filter may be configured for transmitting light of the wavelength of the second light beam $\lambda_1 +/- 10$ nm, in particular, $\lambda_1 +/- 5$ nm, which may be $\lambda_1 +/- 2.5$ nm, in particular, $\lambda_1 +/- 1.5$ nm and/or which may be $\lambda_1 +/- 5\%$, in particular, $\lambda_1 +/- 2\%$, which may be $\lambda_1 +/- 1\%$.

According to one further advantageous refinement, a time difference measuring unit is provided, which includes a digital counter, in particular, controlled by clock sources at a high frequency, and/or a serial connection of multiple digital gates in such a way that the point in time of a generation of a light pulse and the point in time of the detection of the reflected light form the time difference. In this way, a particularly reliable measurement of the time span between the emission of a pulse and the arrival of the light pulse reflected by the object is possible. High frequencies are understood here to mean frequencies in the GHz range, which may be between 1 to 300 GHz, in particular, between 5 to 100 GHz.

According to one further advantageous refinement, the detection unit has a non-linear detection characteristic. This may avoid an overmodulation of the detection unit.

According to one further advantageous refinement, a distance determination unit is provided for determining the distance of the object on the basis of the time difference ascertained by the time difference measuring unit. In this way, the ascertained distance may be directly coded into the detection signal.

Further important features and advantages of the present invention result from the further descriptions herein, from the drawings and from associated figure description with reference to the drawings.

It is understood that the features cited above and those to be explained below are applicable not only in each specified combination, but also in other combinations or alone, without departing from the scope of the present invention.

Configurations and specific embodiments of the present invention are depicted in the drawings and are explained in greater detail in the following description, identical reference numerals relating to identical or similar or functionally identical components or elements.

DETAILED DESCRIPTION

Figure 1:
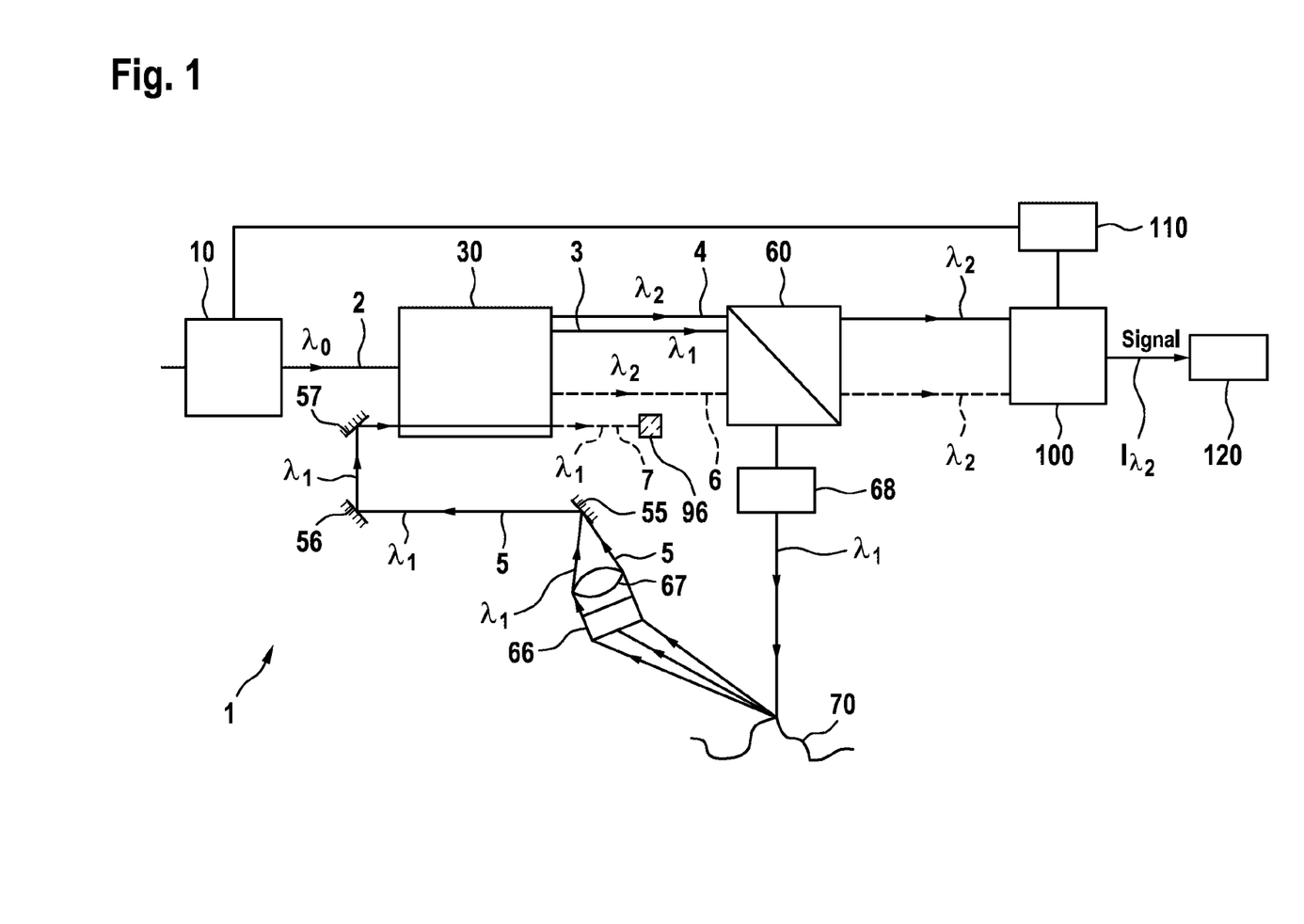
FIG. 1 schematically shows a sensor device according to a first specific embodiment of the present invention.

FIG. 1 shows a sensor device according to a first specific embodiment of the present invention.

A specific embodiment of a system according to the present invention is shown in FIG. 1.

A laser beam 2 including a frequency $f_{laser}$ and wavelength $\lambda_0$, for example 531 nm, is initially generated with the aid of a laser 10. The power of laser 10 is controlled by a pulse-modulated current source including a continuous level $l_1$ and pulse level $l_2$. Laser 10 correspondingly emits a continuous power $P_1$, for example, 1 mW and a pulse power $P_2$, for example 50 W. The pulse length is, for example, between 1 ns to 10 ns, which may be between 2 ns and 8 ns, in particular, between 4 ns and 6 ns.

Laser beam 2 is fed to a non-linear crystal 30. The crystal may be manufactured from (periodically polarized) potassium titanyl phosphate, (periodically polarized) lithium niobate, (periodically polarized) stoichiometric lithium tantalite, barium borate, lithium triborate, bismuth borate and/or potassium hydrogen phosphate. There, an object beam 3 including a frequency $f_{obj}$ and a wavelength $\lambda_1$ is formed in a first step with the aid of parametric fluorescence, also referred to as down-conversion, for detecting an object, and a reference beam 4 including a frequency $f_{ref}$ and a wavelength $\lambda_2$, for example, $\lambda_1$=1550 nm and $\lambda_2$=810 nm, or also any arbitrary wavelength between 700 nm and 1600 nm, the resonance condition $f_{obj}+f_{ref}=f_{laser}$ being met. Object beam and reference beam 3, 4 are identified in this step by the solid line in FIG. 1.

In a second step, object beam and reference beam 3, 4 are spatially separated with the aid of a wavelength-sensitive beam splitter 60, for example, in the form of a dichroitic mirror.

Reference beam 4 is fed to a detector 100 and converted into an electrical signal. Detector 100 may include a photodiode, which detects the intensity of the photon stream and/or an SPAD diode, which responds to individual photons. Alternatively or in addition, an avalanche photodiode may also be used.

Object beam 3 is fed to measuring object 70 with the aid of a transmitting device 68 and/or with the aid of a deflection device. The light of object beam 3 is reflected by measuring object 70—in this case, diffusely—and proportionately received by receiving optical system 67. Receiving optical system 67 includes a wavelength filter 66. The wavelength filter or frequency filter may be a bandpass filter including a high transmission at $\lambda_1$−1.5 nm to $\lambda_1$+1.5 nm and a low transmission at $\lambda_2$. The bandpass filter in this case may be configured for transmitting light of the wavelength of object beam 3 $\lambda_1$+/−10 nm, in particular, $\lambda_1$+/−5 nm, which may be $\lambda_1$+/−2.5 nm, in particular, $\lambda_1$+/−1.5 nm and/or which may be $\lambda_1$+/−5%, in particular, $\lambda_1$+/−2%, which may be $\lambda_1$+/−1% and for low transmission at $\lambda_2$, which may be in a range $\lambda_2$+/−10 nm, in particular, $\lambda_2$+/−5 nm, which may be $\lambda_2$+/−2.5 nm or $\lambda_2$+/−1.5 nm and/or which may be $\lambda_2$+/−5%, in particular, $\lambda_2$+/−2%.

In the third step, light 5, which has been received by receiving optical system 67, is fed via deflection mirrors 55, 56 and 57 again to the non-linear crystal 30. There, in addition to the parametric fluorescence generated in the first step, a light beam 6 of wavelength $\lambda_2$ in turn is formed by the effect of the difference frequency generation as a result of the additional feed of a light beam 5 of wavelength $\lambda_1$. This light beam 6 then subsequently strikes beam splitter 60. The portion of beam 6 of wavelength $\lambda_2$ is fed to detector 100, as a result of which a measuring signal is generated.

Generated light beams 6, 7 after the difference frequency generation are represented by dashed lines in FIG. 1. Light beams 3, 4, 6, 7, which have been generated by parametric fluorescence on the one hand and by difference frequency generation on the other hand, are not distinguishable in terms of their frequency or wavelength. Light beams 3, 4, 6, 7 may, for example, differ in terms of their polarization depending on the selected technology for phase adaptation of the light beams, also referred to as "phase matching." This enables a separation of light beams 3, 4, 6, 7 and unneeded light beam 7 from the difference frequency generation including wavelength $\lambda_1$ may be fed to an absorber 96. The remaining photons of laser 10 may also be fed to the absorber.

Figure 2:
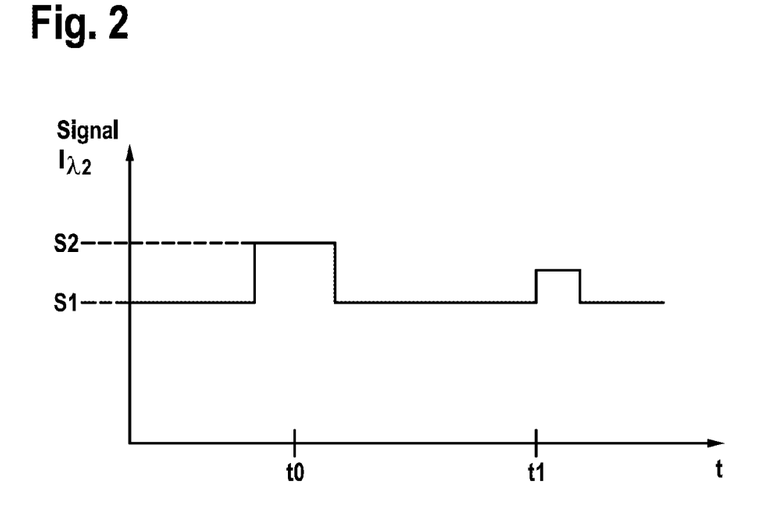
FIG. 2 schematically shows a measuring signal of a detection unit according to a second specific embodiment of the present invention.

Device 1 described in FIG. 1 is a specific embodiment of a LIDAR system, which provides a detection signal that is depicted in FIG. 2. The base level of laser $P_1$ results in a detection signal level $S_1$. The detection signal will rise sharply to level $S_2$ at the point in time of pulse generation to. It is possible to avoid an overmodulation as a result of a non-linear detector characteristic. Only the intensity of reference beam 4 may be seen on detector 100 in the time span between the emission of a light pulse to and the arrival of light $t_{TOF}$ reflected by the object. At point in time $t_1 \approx t_{TOF}$ of the generation of light beam 4 of wavelength $\lambda_2$ via the difference frequency generation in non-linear crystal 30, a change of detection signal $\lambda_2$ is to be expected, as shown in FIG. 2.

The time span between the generation of light pulse 3 and the detection of object 70 may be measured with the aid of a time difference measuring unit 110 and converted with the aid of an evaluation unit 120 into the object distance d being sought:

$$d = \tfrac{1}{2} t_{TOF} * c_0, \text{ where } c_0 = \text{speed of light in a vacuum.}$$

Time span $t_{TOF}$ may be determined using known methods of electrical time measurement. Digital counters that are incremented by high-frequency clock sources, or the series connection of digital gates, the signal to triggering the measurement and the detection terminating the measurement at $t_1$, are particularly suited.

Figure 3:
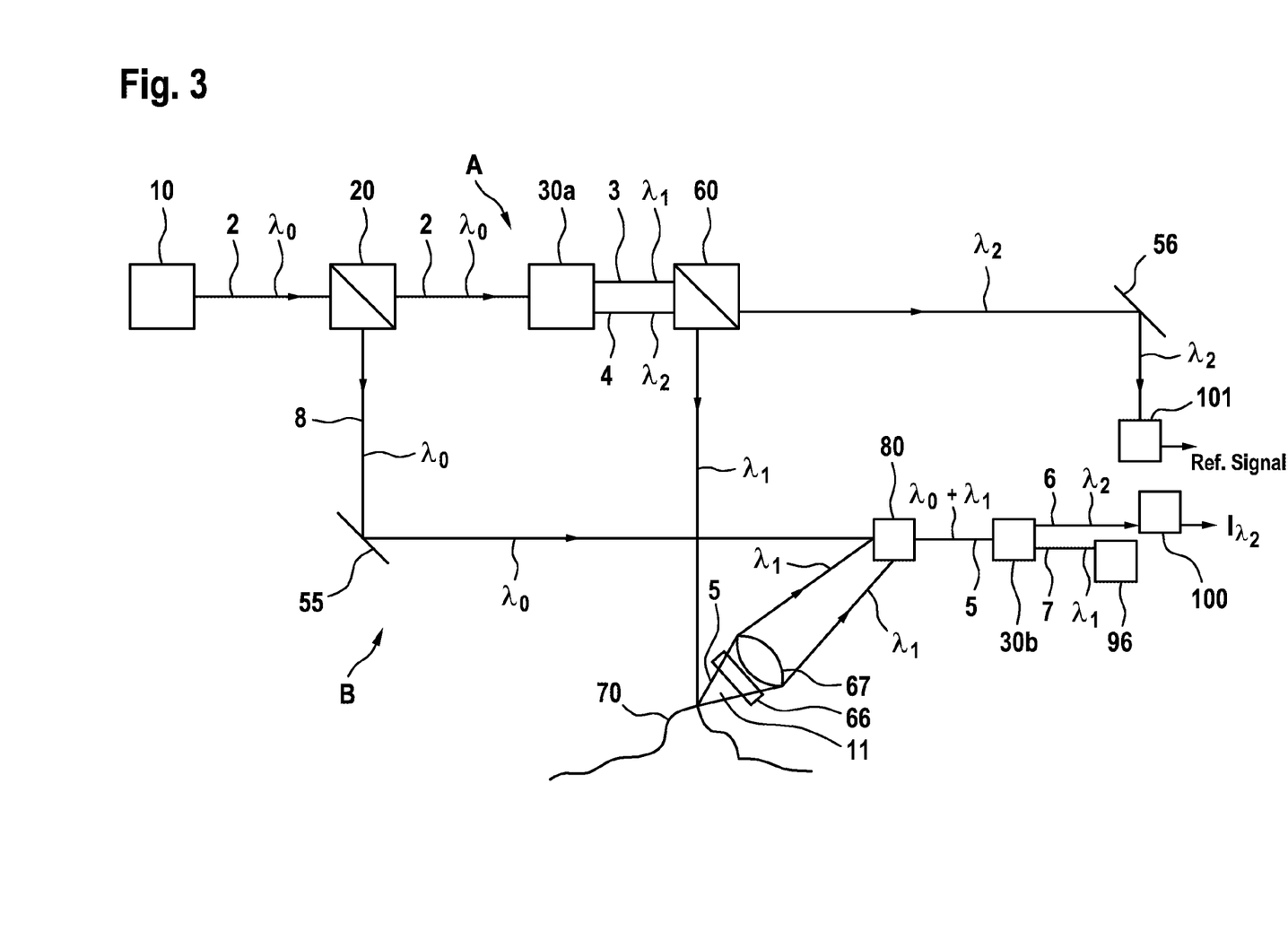
FIG. 3 schematically shows a sensor device according to a third specific embodiment of the present invention.

FIG. 3 shows a second specific embodiment of the present invention, which is described below.

A laser beam 2 including frequency $f_{laser}$ and wavelength $\lambda_0$, for example 531 nm, is initially generated with the aid of laser 10. The power of laser 10 is controlled by a pulse-modulated current source including continuous level $l_2$ and pulse level $l_2$. Laser 10 correspondingly emits a continuous power $P_1$, for example, 1 mW and a pulse power $P_2$, for example 50 W. The pulse length is, for example, between 1 ns to 10 ns, which may be between 2 ns and 8 ns, in particular, between 4 ns and 6 ns.

In a second step, laser beam 2 is split in beam splitter 20. Laser beam 2 on optical path A is fed to a non-linear crystal 30a. The crystal may be manufactured from (periodically polarized) potassium titanyl phosphate, (periodically polarized) lithium niobate, (periodically polarized) stoichiometric lithium tantalite, barium borate, lithium triborate, bismuth borate and/or potassium hydrogen phosphate. There, an object beam 3 including a frequency $f_{obj}$ and a wavelength $\lambda_1$ is formed in a first step with the aid of parametric fluorescence, and reference beam 4 including a frequency $f_{ref}$ and a wavelength $\lambda_2$, where, for example, $\lambda_1$=1550 nm and $\lambda_2$=810 nm, or also any arbitrary wavelength between 700 nm and 1600 nm, the resonance condition $f_{obj}+f_{ref}=f_{laser}$ being met.

In a third step on first optical path A, object beam and reference beam 3, 4 are spatially separated with the aid of a wavelength-selective beam splitter 60, for example, in the form of a dichroitic mirror or the like.

Figure 4:
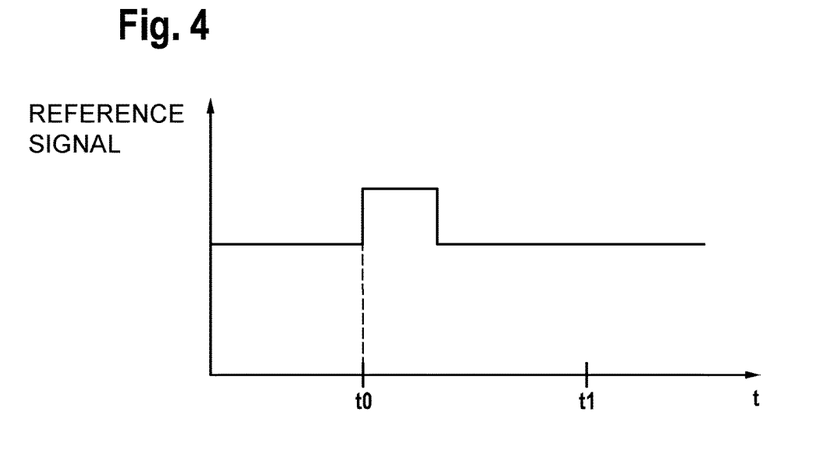
FIG. 4 schematically shows a reference signal of a detection unit according to a fourth specific embodiment of the present invention.

Reference beam 4 is fed to a detector 101 and then converted into an electrical reference signal. Detector 101 may include a photodiode, which detects the intensity of the photon stream, and/or an SPAD diode, which responds to individual photons. The latter enables a reliable detection, even at low light intensity. Alternatively or in addition, an avalanche photodiode may also be used. The reference signal measured in detector 101 is depicted in FIG. 4.

Object beam 3 is fed to measuring object 70. The light of object beam 3 is diffusely reflected by measuring object 70 and proportionately received by receiving optical system 67. Receiving optical system 67 includes a wavelength filter 66. Wavelength filter or frequency filter 66 may be a bandpass filter including a high transmission at $\lambda_1$-1.5 nm to $\lambda_1$+1.5 nm and a low transmission at $\lambda_2$. The bandpass filter in this case may be configured for transmitting light at the wavelength of object beam 3 $\lambda_1$+/-10 nm, in particular, $\lambda_1$+/-5 nm, which may be $\lambda_1$+/-2.5 nm, in particular, $\lambda_1$+/-1.5 nm and/or which may be $\lambda_1$+/-5%, in particular, $\lambda_1$+/-2%, which may be $\lambda_1$+/-1% and for low transmission at $\lambda_2$, which may be in a range $\lambda_2$+/-10 nm, in particular, $\lambda_2$+/-5 nm, which may be $\lambda_2$+/-2.5 nm or $\lambda_2$+/-1.5 nm and/or which may be $\lambda_2$+/-5%, in particular, $\lambda_2$+/-2%.

In the fourth step, the light, which has been received by receiving optical system 67, is combined by a beam combiner 80 with laser beam 8 passing via optical path B and again fed to a non-linear crystal 30b. There, in addition to the parametric fluorescence passing through laser beam 5 via optical path A, an increase in intensity of laser beam 6 of wavelength $\lambda_2$ is formed based on the difference frequency generation as a result of the additional feed of a beam of wavelength $\lambda_1$. The portion of laser beam 6 of wavelength $\lambda_2$ is fed to detector 100, as a result of which a measuring signal is formed, as depicted in FIG. 2. The portion of laser beam 7 of wavelength $\lambda_1$ is no longer needed and may be fed to an absorber 96.

Figure 5:
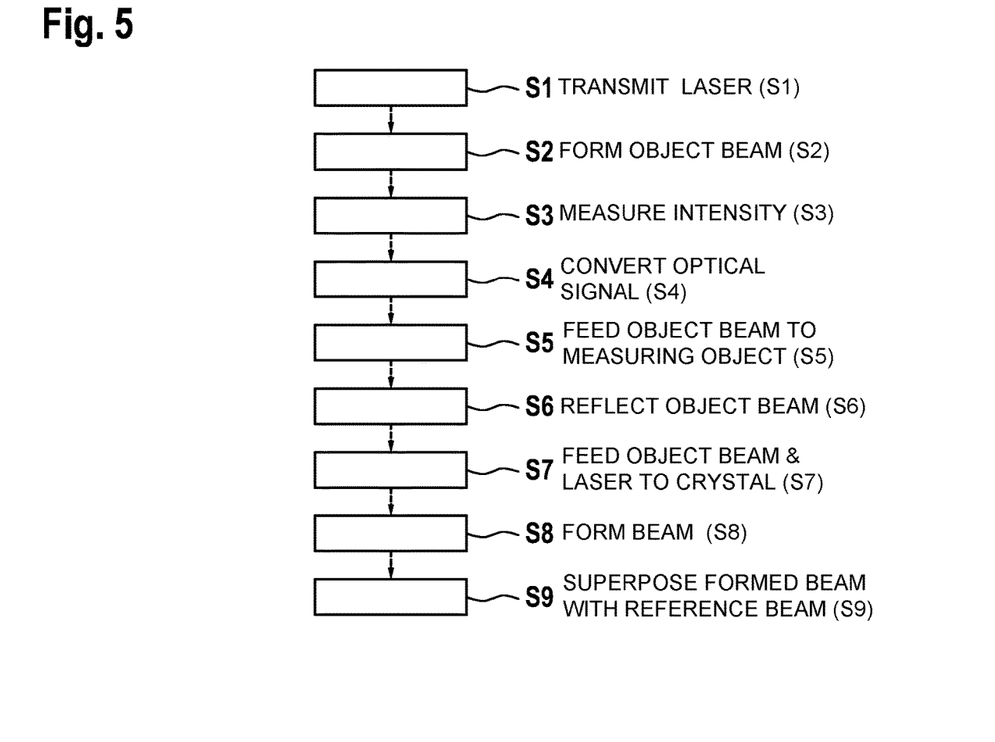
FIG. 5 schematically shows steps of a method according to a fifth specific embodiment of the present invention.

FIG. 5 shows steps of a method according to a fifth specific embodiment of the present invention.

In a first step S1, light of a laser 10 is transmitted into a non-linear optical crystal.

There, an object beam including a frequency $f_{obj}$ and a reference beam $f_{ref}$ is formed in a second step S2 with the aid of parametric fluorescence, also referred to as down-conversion, resonance condition $f_{obj}+f_{ref}=f_{laser}$ being met. The wavelengths of the object beam may be in the range of 1550 nm and the wavelengths of the reference beam may be in the range of 810 nm.

The intensity of the reference beam is continuously measured in a third step S3 with a detector 100, for example, with a photodiode.

In a fourth step S4, the detected optical signal is converted into an electrical signal.

The object beam on the other hand is fed in a fifth step S5 to measuring object 70 with the aid of a suitable transmission device, for example, a lens optical system or mirror optical system and optionally including a deflection device, for example, a micro-mirror or a rotating mirror or the like.

The light of the object beam is diffusely reflected by measuring object 70 in a sixth step S6 and proportionately received by a receiving optical system 67.

In a seventh step S7, the received object beam of frequency $f_{obj}$ is fed together with the laser beam at frequency $f_{laser}$ again to non-linear crystal 30.

There, a beam including frequency $f_{ref}$ is formed in an eighth step S8 as a result of the effect of the difference frequency generation.

This beam is superposed with the reference beam in a ninth step S9 and measured with detector 100 described in third step S3. This results in an excessive increase of the intensity of the measuring signal. The time difference between the initial measurement of the reference beam and the measurement of the intensity increase serves as a measuring signal for determining the object distance.

In summary, a compact, cost-efficient and reliable LIDAR sensor system including a high degree of sensitivity and high degree of eye safety is provided by the present invention and, in particular, by at least one of the specific embodiments described. Specifically, an optimization in terms of eye safety and/or maximization of the admissible transmission power, for example, are/is possible in this system by separating the wavelength for the illumination of the object and for the detection, regardless of the implementation of a suitable detector. In addition, a bandwidth of a spectral filter situated in the detection path is no longer noise power dominant and is, in particular, therefore independent of sunlight. Thus, a flat detector may, for example, be used in a biaxial detection path or all the light collected by the receiving optical system may be fed to a single detector with the aid of a suitable structure in the integrated photonic system, and thus a receiving array may be avoided. At the same time, a narrow-band and angle-independent, but complex, wavelength filter may be dispensed with.

Moreover, a high degree of sensitivity is enabled, since a completely different noise power path is used, which allows for a compact LIDAR system including smaller lenses and, if necessary, micro-mirror deflection. The LIDAR system may also be combined with optical phase arrays.

The present invention, although it has been described with reference to t exemplary embodiments, is not limited thereto, but is modifiable in a variety of ways.

What is claimed is:

1. A method for providing a detection signal for an object to be detected, the method comprising:
   generating at least one first and one second light beam including different frequencies with a first optical non-linear 3-wave process from a light beam of a light source including an output frequency, wherein the first light beam includes a reference frequency being detected, wherein the second light beam includes an object frequency being emitted and being received after reflection on an object, and wherein the light beam includes the output frequency and the second light beam including the object frequency being superposed;

generating a reference beam including a reference frequency with a second optical non-linear 3-wave process from the two superposed light beams including the output frequency and including the object frequency; and generating a detection signal so that a distance of the object is determinable due to the aforementioned superposition based on the time difference between the detection of the first light beam including the reference frequency and a detection of a change of the reference beam including the reference frequency.

2. The method of claim 1, wherein the intensity of the reference beam includes the reference frequency changes, in particular, increases due to the aforementioned superposition.

3. A sensor device for providing a detection signal for an object to be detected, comprising:
   a light source for generating an output beam including at least one output frequency;
   a first beam generation unit for generating at least one first and one second light beam of different frequency with a first optical non-linear 3-wave process from the output beam;
   a second beam generation unit for generating a reference beam including reference frequency with a second optical non-linear 3-wave process from a superposition of the second light beam emitted and received after reflection on the object, and the light beam including the output frequency; and
   a detection unit for detecting light, the detection unit being configured to generate a detection signal so that the distance of the object is determinable due to the aforementioned superposition based on the time difference between the detection of the first light beam including the reference frequency and a detection of a change of the reference beam including the reference frequency.

4. The sensor device of claim 3, wherein the first and/or second beam generation unit includes a non-linear optical crystal, the non-linear optical crystal being manufactured from, in particular, periodically polarized potassium titanyl phosphate, lithium niobate and/or stoichiometric lithium tantalate and/or barium borate, lithium triborate, bismuth borate and/or potassium hydrogen phosphate.

5. The sensor device of claim 3, wherein the first beam generation unit is configured to provide the first optical non-linear 3-wave process with a spontaneous parametric fluorescence.

6. The sensor device of claim 3, wherein the second beam generation unit is configured to provide the second optical non-linear 3-wave process with difference frequency generation.

7. The sensor device of claim 3, further comprising:
   an absorber, manufactured from black silicon, for absorbing at least light beams from the second beam generation unit.

8. The sensor device of claim 3, further comprising:
   a receiving unit for receiving light beams reflected by objects, which includes a frequency filter, in particular a bandpass filter, to suppress the first light beam and for transmitting the second light beam.

9. The sensor device of claim 3, further comprising:
   a time difference measuring unit, which includes a digital counter, in particular controlled by clock sources at a high frequency, and/or a serial connection of multiple digital gates, so that the point in time of a generation of a light pulse and the point in time of the detection of the reflected light form the time difference.

10. The sensor device of claim 3, wherein the detection unit has a non-linear detection characteristic.

11. A LIDAR scanner or a micro-scanner, comprising:
    at least one sensor device for providing a detection signal for an object to be detected, the sensor device including:
    a light source for generating an output beam including at least one output frequency;
    a first beam generation unit for generating at least one first and one second light beam of different frequency with a first optical non-linear 3-wave process from the output beam;
    a second beam generation unit for generating a reference beam including reference frequency with a second optical non-linear 3-wave process from a superposition of the second light beam emitted and received after reflection on the object, and the light beam including the output frequency; and
    a detection unit for detecting light, the detection unit being configured to generate a detection signal so that the distance of the object is determinable due to the aforementioned superposition based on the time difference between the detection of the first light beam including the reference frequency and a detection of a change of the reference beam including the reference frequency; and
    a micromechanical mirror for deflecting a beam of the first beam generation unit.

* * * * *